United States Patent
Xie et al.

(10) Patent No.: US 12,277,759 B2
(45) Date of Patent: *Apr. 15, 2025

(54) DUAL DEEP LEARNING ARCHITECTURE FOR MACHINE-LEARNING SYSTEMS

(71) Applicant: EQUIFAX INC., Atlanta, GA (US)

(72) Inventors: Ying Xie, Marietta, GA (US); Linh Le, Kennesaw, GA (US)

(73) Assignee: Equifax Inc., Atlanta, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/405,709

(22) Filed: Jan. 5, 2024

(65) Prior Publication Data

US 2024/0144665 A1 May 2, 2024

Related U.S. Application Data

(63) Continuation of application No. 17/820,249, filed on Aug. 17, 2022, now Pat. No. 11,893,781, which is a
(Continued)

(51) Int. Cl.
*G06V 10/82* (2022.01)
*G06F 16/583* (2019.01)
(Continued)

(52) U.S. Cl.
CPC ............ *G06V 10/82* (2022.01); *G06F 16/583* (2019.01); *G06F 16/90335* (2019.01);
(Continued)

(58) Field of Classification Search
CPC ....... G06K 9/6217; G06N 3/0454; G06N 3/08
See application file for complete search history.

(56) References Cited

U.S. PATENT DOCUMENTS

| | | | |
|---|---|---|---|
| 6,976,012 B1* | 12/2005 | Rising, III | G06N 3/045 706/15 |
| 11,461,383 B2 | 10/2022 | Xie et al. | |
| 2021/0150255 A1* | 5/2021 | Wang | G06F 18/22 |

OTHER PUBLICATIONS

U.S. Appl. No. 16/141,152, Notice of Allowance, Mailed On May 16, 2022, 11 pages.
(Continued)

*Primary Examiner* — Edward Park
(74) *Attorney, Agent, or Firm* — Kilpatrick Townsend & Stockton LLP

(57) ABSTRACT

Certain aspects involve a machine-learning query system that uses a dual deep learning network to service queries and other requests. In one example, a machine-learning query system services a query received from a client computing system. A dual deep learning network included in the machine-learning query system matches an unstructured input data object, received from the client computing system, to an unstructured reference data object. The matching may include generating an input feature vector by an embedding subnetwork, based on the unstructured input data object. The matching may also include generating an output probability by a relationship subnetwork, based on the input feature vector and a relationship feature vector that is based on the unstructured reference data object. The machine-learning query system may transmit a responsive message to the client system.

20 Claims, 7 Drawing Sheets

Related U.S. Application Data continuation of application No. 16/141,152, filed on Sep. 25, 2018, now Pat. No. 11,461,383.

(60) Provisional application No. 62/562,898, filed on Sep. 25, 2017.

(51) Int. Cl.
| | |
|---|---|
| *G06F 16/903* | (2019.01) |
| *G06F 18/21* | (2023.01) |
| *G06N 3/045* | (2023.01) |
| *G06N 3/08* | (2023.01) |
| *G06V 10/44* | (2022.01) |
| *G06V 10/764* | (2022.01) |
| *G06V 40/16* | (2022.01) |

(52) U.S. Cl.
CPC ............ *G06F 18/21* (2023.01); *G06N 3/045* (2023.01); *G06N 3/08* (2013.01); *G06V 10/454* (2022.01); *G06V 10/764* (2022.01); *G06V 40/16* (2022.01)

(56) References Cited

OTHER PUBLICATIONS

U.S. Appl. No. 17/820,249, Non-Final Office Action, Mailed On Jun. 2, 2023, 6 pages.

U.S. Appl. No. 17/820,249, Notice of Allowance, Mailed On Sep. 20, 2023, 13 pages.

Bredin , "Tristounet: Triplet Loss For Speaker Turn Embedding", In Acoustics, Speech And Signal Processing (ICASSP), Mar. 2017, pp. 5430-5434.

Hermans et al., "In Defense of the Triplet Loss for Person Re-Identification", Available online At: https://arxiv.org/abs/1703.07737, Mar. 2017, 17 pages.

Huang et al., "Labeled Faces In The Wild: A Database For Studying Face Recognition In Unconstrained Environments", Technical Report 07-49, vol. 1, No. 2, 2007, 11 pages.

Le et al., "Deep Kernel: Learning Kernel Function From Data Using Deep Neural Network", IEEE/ACM 3rd International Conference on Big Data Computing Applications and Technologies (BDCAT), Dec. 2016, pp. 1-7.

Pulli et al., "Real-Time Computer Vision With OpenCV", Communications of the ACM, vol. 55, No. 6, Jun. 2012, pp. 61-69.

Schroff et al., "FaceNet: A Unified Embedding for Face Recognition and Clustering", In Proceedings of the IEEE Computer Society Conference on Computer Vision and Pattern Recognition, 2015, pp. 815-823.

Setty et al., "Indian Movie Face Database: A Benchmark For Face Recognition Under Wide Variations", IEEE, Fourth National Conference on Computer Vision, Pattern Recognition, Image Processing and Graphics (NCVPRIPG), 2013, pp. 1-5.

\* cited by examiner

DUAL DEEP LEARNING ARCHITECTURE FOR MACHINE-LEARNING SYSTEMS

CROSS-REFERENCES TO RELATED APPLICATIONS

This application is a continuation of U.S. patent application Ser. No. 17/820,249, filed Aug. 17, 2022, entitled DUAL DEEP LEARNING ARCHITECTURE FOR MACHINE-LEARNING SYSTEMS, which is a continuation of U.S. patent application Ser. No. 16/141,152, filed Sep. 25, 2018, entitled DUAL DEEP LEARNING ARCHITECTURE FOR MACHINE-LEARNING SYSTEMS, now U.S. Pat. No. 11,461,383, issued Oct. 4, 2022, which claims the benefit of U.S. Provisional Application No. 62/562,898, filed Sep. 25, 2017, the contents of which are hereby incorporated by reference in their entireties for all purposes.

TECHNICAL FIELD

This disclosure generally relates to artificial intelligence and machine learning, and more particularly relates to improving query performance by applying a dual deep learning architecture of a machine-learning system to query parameters.

BACKGROUND

Machine-learning techniques can involve using computer-implemented models and algorithms (e.g., a convolutional neural network, a support vector machine, etc.) to simulate human decision-making. For instance, a computer system programmed with a machine-learning model can learn from training data and thereby perform a future task that involves circumstances or inputs similar to the training data. Such a computing system can be used, for example, to recognize certain individuals or objects in an image, to simulate or predict future actions by an entity based on a pattern of interactions to a given individual, etc.

In one example of machine-learning techniques, deep learning systems use a large number of parameters, such as node weights and connections, structured by layers of neural networks to map input data to an explicit feature space with specified dimensionality. The parameters of the network that determine the mapping of certain inputs to certain outputs are often tuned based on an explicit learning objective. For instance, the mapping of data into high-level representations can be directly guided by a given learning objective, often through a top-down learning processes such as gradient descent. Therefore, a learning objective for a deep learning system impacts the quality of mapping between inputs and desired outputs.

SUMMARY

In some aspects, a machine-learning query system services a query received from a client computing system. A dual deep learning network included in the machine-learning query system matches an unstructured input data object, received from the client computing system, to an unstructured reference data object. The matching may include generating an input feature vector by an embedding subnetwork, based on the unstructured input data object. The matching may also include generating an output probability by a relationship subnetwork, based on the input feature vector and a relationship feature vector that is based on the unstructured reference data object. The machine-learning query system may transmit a responsive message to the client system.

BRIEF DESCRIPTION OF THE DRAWINGS

Aspects of the present disclosure can be better understood with reference to the following diagrams. The drawings are not necessarily to scale, with emphasis instead being placed upon clearly illustrating certain features of the disclosure.

DETAILED DESCRIPTION

Figure 1:
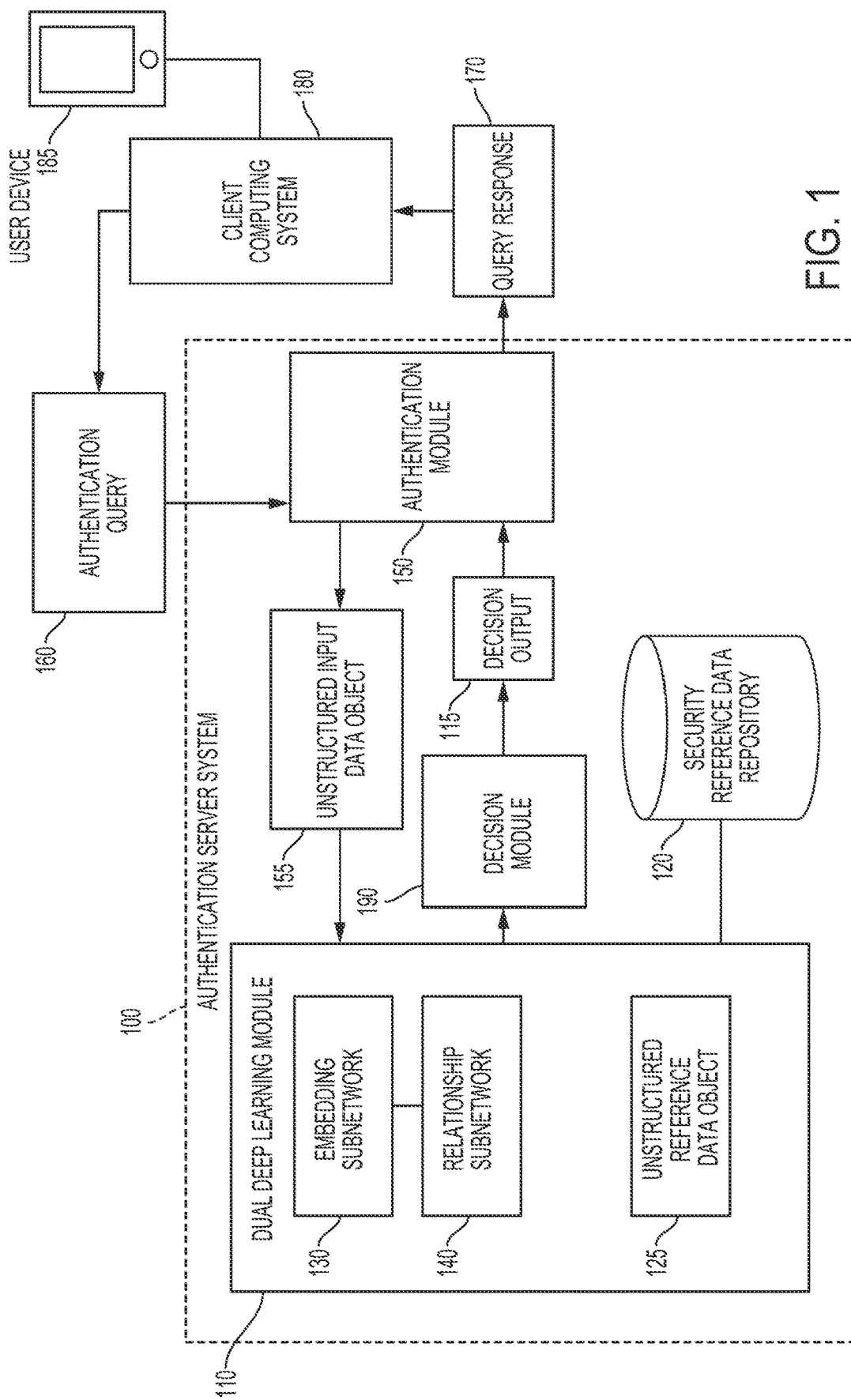
FIG. 1 depicts an example of an authentication system configured to use a dual deep learning neural network to authenticate unstructured data, according to some aspects of the present disclosure.

Existing machine-learning systems can inaccurately or inefficiently service queries to a remote data source. For instance, a computing system may be unable to adequately complete a certain objective, such as querying a data source for relevant search results, analytical assessments, authentication data, and the like, if the computing system relies on neural networks that have been inadequately trained for that objective. Existing solutions for configuring a computing system with machine-learning capability often rely on transfer learning, in which a pre-trained neural network configured for a related task is modified by replacing a decision layer of the pre-trained neural network with a new decision layer for the new task. But merely replacing a decision layer in an existing neural network can cause the retrained neural network to inaccurately classify certain data objects or otherwise fail to accurately simulate the desired decision-making process. These existing solutions thereby expend computing resources to reconfigure existing machine-learning models without achieving a desired performance with respect to a desired objective.

Certain aspects of this disclosure relate to a machine-learning query system that uses a dual deep learning network to service queries involving unstructured data (e.g., videos, images, narrative text, sequence data, etc.). For instance, the machine-learning query system can service one or more queries having unstructured input data objects as query parameters by applying the dual deep learning network to the unstructured input data object. The dual deep learning network can apply an embedding subnet that is trained to encode different unstructured data objects having a particular feature into similar feature vectors. For instance, the embedding subnet can encode an input image captured from a mobile device into a feature vector that represents, in a structured manner, one or more relevant visual attributes of the image, such as the set of curves and colors that collectively depict a face.

The dual deep learning network can also apply a decision subnet to an input feature vector that is generated by the embedding subnet from the unstructured input data object. In some aspects, the architecture of the embedding subnet, which is used for encoding unstructured data into feature vectors, is different from the architecture of the decision subnet, which is used for performing one or more query-services objectives by comparing pairs of structured feature vectors. The decision subnet can learn, using a trained embedding subnet, how to map input feature vectors to one or more decisions. In the example above, the trained decision subnet can classify an input image feature vector as being similar to a reference image feature vector, which is generated by the embedding subnet from an unstructured reference image. The computing system can generate a response to a query based on the classification. For instance, if the query involves requesting authentication of a user of a mobile device that transmits the input image, servicing the query can involve authenticating the user by using the decision subnet to determine that the input image feature vector and the reference image feature vector are in the same class.

Some examples of these aspects can overcome one or more of the issues identified above by integrating different machine-learning architectures in a manner that is customized toward a particular objective. For instance, applying a pre-trained neural network to a particular target system's data for decision-making can lead to inaccurate classifications or other incorrect outputs of the pre-trained neural network. These errors can result from, for example, the target system's data being poorly represented in the dataset used to train the neural network, the target system's training objective being different from an objective used to train the neural network, etc. In some aspects, using separately trained neural networks, such as an embedding subnet and a decision subnet, can optimize the embedding subnet for encoding features of unstructured data into structured feature vectors and thereby allow, for example, a complex similarity function to be learned by the decision subnet based on the optimized embedding of the data. Training the decision subnet with an optimized feature space provided by the embedding subnet can improve the accuracy of classifications or other desired operations performed by the decision subnet as compared to existing network architectures.

The features discussed herein are not limited to any particular hardware architecture or configuration. A computing device can include any suitable arrangement of components that provide a result conditioned on one or more inputs. Suitable computing devices include multipurpose, microprocessor-based computing systems accessing stored software that programs or configures the computing system from a general-purpose computing apparatus to a specialized computing apparatus implementing one or more aspects of the present subject matter. Any suitable programming, scripting, or other type of language or combinations of languages may be used to implement the teachings contained herein in software to be used in programming or configuring a computing device. The neural networks described herein may be implemented as one or more neural networks or subnetworks, including any suitable combination of neural networks.

Referring now to the drawings, FIG. 1 is a diagram depicting an example of an authentication system that is configured to use a dual deep learning neural network to authenticate unstructured data, such as an authentication server system 100. The authentication server system 100 may be (or include) a machine learning query system. In some aspects, a client computing system 180 may be configured to communicate with the authentication server system 100, such as by one or more public or private networks. In some cases, the client computing system 180 is an access control computing system that is configured to allow or deny access to secured data or services, based on a responsive message received from the authentication server system 100. The client computing system 180 and the authentication server system 100 may exchange data, such as data related to an authentication request. For example, the client computing system 180 may receive a request for services from another computing system, such as from a user device 185. The requested services may be protected, such as access to secured data, and the requesting system may be required to provide authentication information in order to access the requested services.

In some aspects, the authentication server system 100 may receive, from the client computing system 180, an authentication query 160. The authentication query 160 may include one or more query parameters, such as query parameters describing the request for services. In some cases, the authentication query 160 may include at least one data object representing data provided to authenticate a user of the user device 185. In addition, the at least one data object may represent unstructured data, such as data that is unorganized, or that lacks a pre-defined model. For example, the unstructured data in the authentication query 160 may include (without limitation) image data, such as a photograph; three-dimensional image data; audio data, such as a recorded voice; time series data, such as a group of timestamps correlated with purchase information; or any other type of unstructured data. In some cases, the unstructured data may be associated with a user of the user device 185. For example, the user may provide unstructured data including an image of the user (e.g., a photograph taken by the user device 185), a three-dimensional image of the user, or a voice recording of the user.

In some cases, the authentication server system 100 may include one or more of an authentication module 150, a dual deep learning module 110, or a decision module 190. The authentication module 150 may receive the authentication query 160. In addition, the authentication module 150 may generate an unstructured input data object 155 based on the unstructured data from the authentication query 160. The unstructured input data object 155 may be provided as an input to the dual deep learning module 110. In some cases, the dual deep learning module 110 may be configured to determine a similarity between provided input data and reference data. In addition, the similarity may be determined based on unstructured input data and unstructured reference data. In some aspects, the decision module 190 may be configured to generate a decision output based on similarity information generated by the dual deep learning module 110.

In some aspects, in response to receiving the authentication query 160, the dual deep learning module 110 may determine a similarity between the unstructured input data object 155 and an unstructured reference data object 125.

For example, the unstructured input data object 155 may include a digital photographic image generated by the user device 185, provided via the authentication query 160. In addition, the unstructured reference data object 125 may include an authentication digital photographic image that is stored by (or otherwise accessible by) the authentication server system 100. In some cases, the unstructured reference data object 125 may be stored in a data repository, such as a security reference data repository 120. The security reference data repository 120 may include authentication images that are associated with, for example, one or more user accounts, such as users who are registered with the client computing system 180. In addition, the unstructured reference data object 125 may be associated with a user account indicated by the authentication query 160, such as a user account that is requested by a user of the user device 185.

In some aspects, the dual deep learning module 110 may include one or more neural networks configured to determine a similarity between unstructured data objects. In addition, the dual deep learning module 110 may include one or more subnetworks, such as an embedding subnetwork 130 or a relationship subnetwork 140. The embedding subnetwork 130 may determine one or more embedded features of the unstructured input data object 155. In addition, the relationship subnetwork 140 may determine a similarity between the embedded features of the unstructured input data object 155 and additional features of the unstructured reference data object 125. In some cases, the similarity is determined between pairs of the embedded features and the additional features. In addition, the similarity may indicate a classification for the embedded features or the additional features. In some cases, the relationship subnetwork 140 may receive, as an input, the output of the embedding subnetwork 130. In addition, the output of the relationship subnetwork 140 may be received by one or more other computing systems or software modules, such as by the decision module 190.

Based on the output of the relationship subnetwork 140, the decision module 190 may generate a decision output 115. In some cases, the decision module 190 is a neural network configured to provide a decision based on the similarity data. The decision output 115 may include data indicating that the unstructured input data object 155 is similar (or dissimilar) to the unstructured reference data object 125. In some cases, the decision module 190 may provide the decision output 115 to the authentication module 150. The authentication module 150 may provide to the client computing system 180 a responsive message, such as a query response 170, that is based on the decision output 115. In some cases, the query response 170 may include data indicating the unstructured input data object 155 matches the unstructured reference data object 125. In addition, the query response 170 may include data indicating that the input object 155 does not match the reference object 125. In some cases, the client computing system 180 may allow or deny the user device 185 access to the requested services, in response to the query response 170. For example, if the query response 170 indicates a match between input object 155 and the reference object 125, the client computing system 180 may allow access to the requested services. In addition, if the query response 170 indicates that the input object 155 and the reference object 125 are dissimilar, the client computing system 180 may deny access to the requested services.

Figure 2:
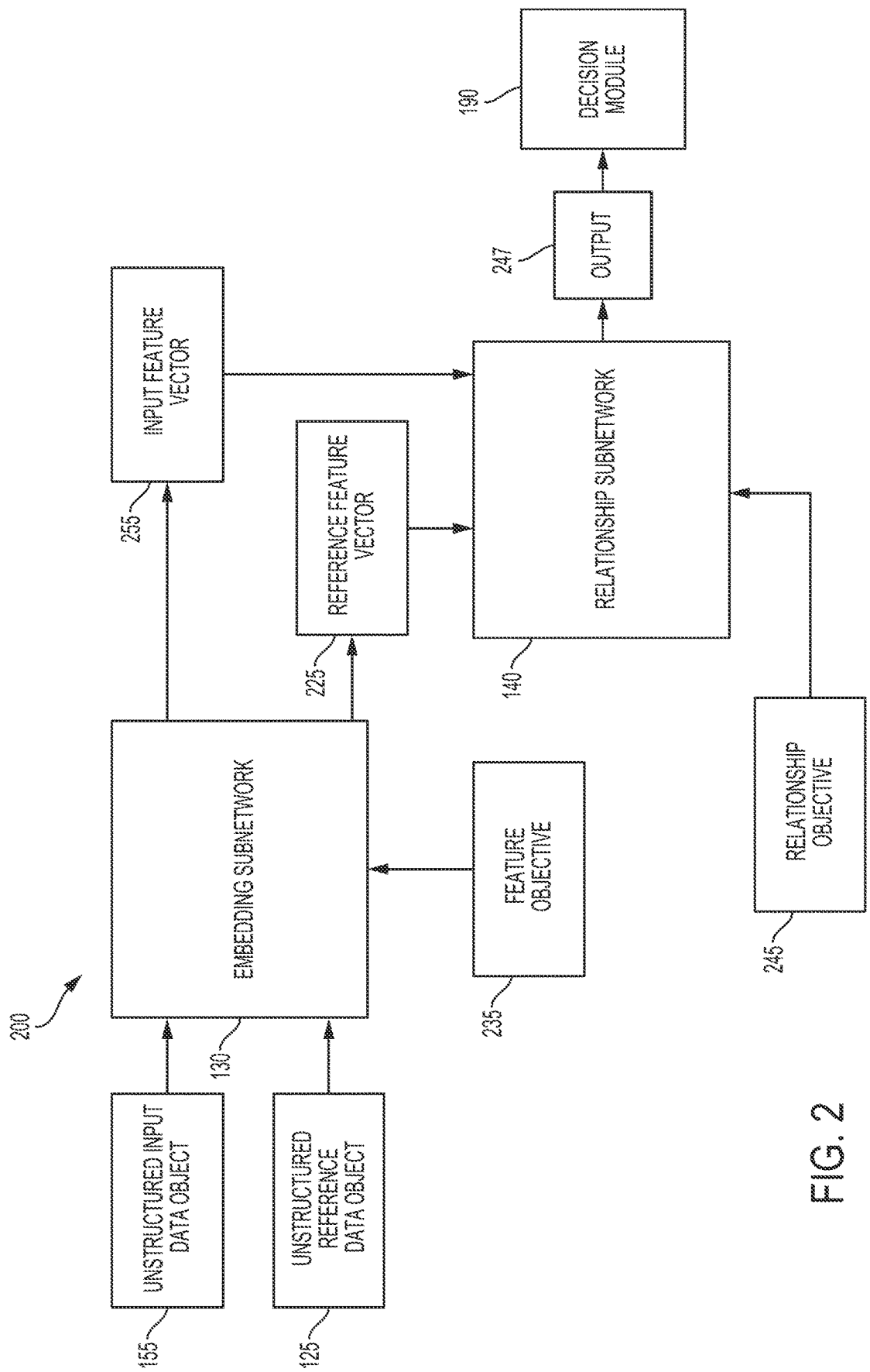
FIG. 2 depicts an example of a dual deep learning neural network, according to some aspects of the present disclosure.

FIG. 2 is a diagram depicting an example of a dual deep learning neural network 200. In some aspects, the dual deep learning neural network 200 is included in a software module, such as the dual deep learning module 110. In FIG. 2, the dual deep learning neural network 200 is depicted as including the embedding subnetwork 130, the relationship subnetwork 140, and the decision module 190, but other configurations are possible. For example, the embedding subnetwork 130, the relationship subnetwork 140, and the decision module 190 may be executed on respective computing systems. The dual deep learning neural network 200 may have an architecture in which each of the embedding subnetwork 130 and the relationship subnetwork 140 has multiple layers, including one or more input layers. In some aspects, an output of the embedding subnetwork 130 is provided to an input layer of the relationship subnetwork 140.

In the dual deep learning neural network 200, each of the embedding subnetwork 130 and the relationship subnetwork 140 may receive an additional input indicating a learning objective. In some cases, such as in a loosely coupled architecture, the subnetworks 130 and 140 may each receive a respective learning objective. In addition, the subnetworks 130 and 140 may each receive the same learning objective, such as in a tightly coupled architecture.

In some cases, the embedding subnetwork 130 may receive a feature objective 235, indicating a goal for the embedding subnetwork 130. For example, the feature objective 235 may include a minimization function, such as a triplet loss cost function. In this example, the embedding subnetwork 130 may determine embedded features of input data based on the minimization function, such as by minimizing a distance between features having the same classification.

In addition, the relationship subnetwork 140 may receive a relationship objective 245, indicating a goal for the relationship subnetwork 140. For example, the relationship objective 245 may include a minimization function, such as a classification function or an identification function. The relationship subnetwork 140 may provide an output based on the particular function included in the relationship objective 245. For example, if the relationship objective 245 includes a classification function, the relationship subnetwork 140 may provide an output indicating a probability of multiple sets of input data having a common class. In addition, if the relationship objective 245 includes an identification function, the relationship subnetwork 140 may provide an output indicating a similarity between multiple sets of input data.

In the dual deep learning neural network 200, the embedding subnetwork 130 may determine a vector of embedded features based on unstructured data. Features may include interpreted qualities of the unstructured data. For example, if the unstructured data includes image data, the embedded features of the unstructured image data may include qualities such as color, edges, or textures represented by the image data. If the unstructured data includes audio data, the embedded features of the unstructured audio data may include qualities such as high-pitched voices, low-pitched voices, or percussive sounds represented by the audio data. In some cases, embedded features of unstructured data may include features not intended for human interpretation, such as mathematical gradients of color or trend data. In some cases, the embedding subnetwork 130 may determine features based on a learned classification of training features. For example, based on analysis of unstructured training data, the embedding subnetwork 130 may determine one or more classes of training features based on the feature objective 235. In some cases, each class of training features includes a group of features having a minimized distance between each feature in the group. The embedding subnetwork 130 may include, without limitation, a deep learning neural network, a convolutional neural network, a three-dimensional convolutional neural network, a recurrent neural network, a long-short term memory neural network, a gated recurrent unit, or any other suitable neural network or combination of neural networks.

In some cases, the embedding subnetwork 130 may receive the unstructured input data object 155, such as described in regards to FIG. 1. Based on the unstructured input data object 155, the embedding subnetwork 130 may determine an input feature vector 255. The input feature vector 255 may represent features present in the unstructured input data object 155. The embedding subnetwork 130 may determine the input feature vector 255 based on the feature objective 235. For example, the embedding subnetwork 130 may determine the features in the input feature vector 255 based on the included minimization function, by determining one or more features that are within a threshold distance to a particular class of training features.

In addition, the embedding subnetwork 130 may receive the unstructured reference data object 125. Based on the unstructured reference data object 125, the embedding subnetwork 130 may determine a reference feature vector 225 representing features present in the unstructured reference data object 125. The embedding subnetwork 130 may determine the reference feature vector 225 based on the feature objective 235, such as by determining one or more features within the threshold distance to a class of training features. In some cases, the reference feature vector 225 may be determined in advance of the input feature vector 255. For example, the reference feature vector 225 may be stored in a location accessible by the dual deep learning neural network 200 (e.g., the security reference data repository 120, as described in regards to FIG. 1).

In the dual deep learning neural network 200, the relationship subnetwork 140 may receive each of the input feature vector 255 and the reference feature vector 225 as an input to one or more layers. Based on the relationship objective 245, the relationship subnetwork 140 may determine an output based on a combination of the input feature vector 255 and the reference feature vector 225. For example, if the relationship objective 245 includes a classification function, the relationship subnetwork 140 may determine a probability of whether embedded features represented by the input feature vector 255 and reference feature vector 225 belong to the same class. In addition, if the relationship objective 245 includes an identification function, the relationship subnetwork 140 may determine a similarity between the embedded features represented by the input feature vector 255 and reference feature vector 225. The relationship subnetwork 140 may include, without limitation, a deep learning neural network, a deep kernel neural network, a deep embedded kernel neural network, or any other suitable neural network or combination of neural networks.

In some aspects, the relationship subnetwork 140 provides an output 247, such as an output including the determined probability or similarity. The output 247 may be provided to a decision module, such as the decision module 190. The decision module 190 may be similarity-based. In some aspects, the decision module 190 may be configured to determine a decision based on the output 247. In addition, the decision module 190 may be configured to generate decisions based on a certain task, such as an identification task or a classification task. In some cases, one or more of the learning objectives provided to the embedding subnetwork 130 or the relationship subnetwork 140 are based on the configuration of the decision module 190. For example, if the decision module 190 is configured for a classification task, the relationship objective 245 may be a learning objective associated with a classification task. In addition, if the decision module 190 is configured for an identification task, the relationship objective 245 may be a learning objective associated with an identification task. The decision module 190 may include, without limitation, a support vector machine neural network, a support vector regression neural network, a K-nearest-neighbor neural network, or any other suitable neural network or combination of neural networks.

In some aspects, the decision module 190 may generate and provide a decision based on probability or similarity data received from the relationship subnetwork 140. For example, the authentication module 150 may receive the decision as part of the decision output 115. In some cases, the authentication module 150 may generate the query response 170 based on the output 247. For example, if the output 247 indicates a low probability that the unstructured input data object 155 and the unstructured reference data object 125 have a common classification, the authentication module 150 may generate a query response 170 indicating that input data object does not match the reference data object.

Figure 3:
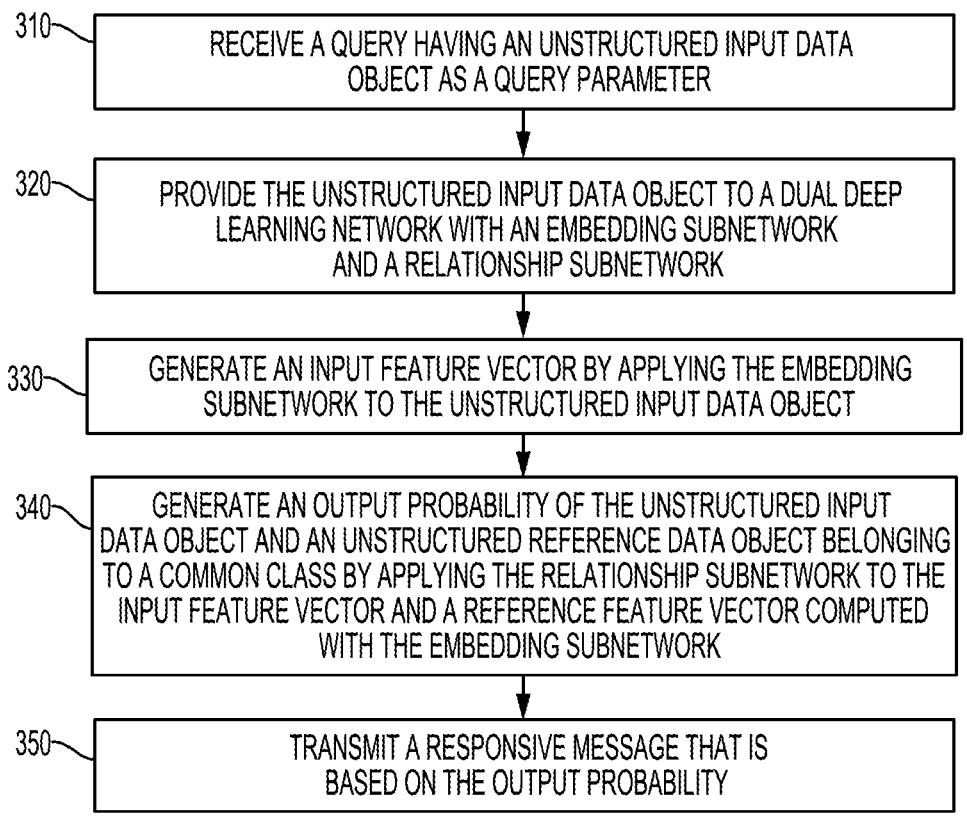
FIG. 3 is a flow chart depicting an example of a process for servicing a query by applying a dual deep learning network to unstructured data included in a query parameter, according to some aspects of the present disclosure.

FIG. 3 is a flow chart depicting an example of a process for servicing a query by applying a dual deep learning neural network to unstructured data included in a query parameter. In some aspects, such as described in regards to FIGS. 1 and 2, a system executing a dual deep learning neural network implements operations described in FIG. 3, by executing suitable program code. For illustrative purposes, the process in FIG. 3 is described with reference to the examples depicted in FIGS. 1 and 2. Other implementations, however, are possible.

At block 310, the process depicted in FIG. 3 involves receiving a query having one or more query parameters. In some cases, the received query may be an authentication query, such as the authentication query 160. In addition, the received query may be an assessment query, such as a request for a risk assessment, or any other suitable query. The query parameters include an unstructured input data object, such as the unstructured input data object 155. In addition, the query may be received from a computing system capable of controlling access to one or more requested services, such as the client computing system 180.

At block 320, the process depicted in FIG. 3 involves providing the unstructured input data object to a dual deep learning neural network. The dual deep learning neural network may include an embedding subnetwork and a relationship subnetwork. In some cases, the dual deep learning neural network is executed by a computing system, such as the authentication server system 100. In addition, the dual deep learning neural network, the embedding subnetwork, and the relationship subnetwork may be executed by one or more processing devices included in one or more computing devices. For example, the authentication server system 100 may include a computing system that executes the embedding subnetwork 130 and an additional computing system that executes the relationship subnetwork 140.

At block 330, the process depicted in FIG. 3 involves generating an input feature vector based on the unstructured input data object. In some cases, the input feature vector is generated by applying the embedding subnetwork to the unstructured input data object. For example, the embedding subnetwork 130 may generate the input feature vector 255 based on the unstructured input data object 155. In some cases, one or more additional feature vectors are generated by applying the embedding subnetwork to one or more additional data objects. For example, the embedding subnetwork 130 may generate the reference feature vector 225 based on the unstructured reference data object 125. In addition, the one or more additional feature vectors are received by the dual deep learning neural network, such as a stored reference feature vector that is accessible by the dual deep learning neural network. In some cases, the stored reference feature vector may be generated by the embedding subnetwork during a previous time and accessed in response to receiving the unstructured input data object.

In some aspects regarding block 330, the input feature vector is generated by applying a trained embedding subnetwork to the unstructured data object. For example, the trained embedding subnetwork may be trained to generate training feature vectors based on unstructured training data objects. In some cases, the embedding subnetwork is trained to generate optimized training feature vectors. The optimization of the training feature vectors may be based on minimization of a loss function. For example, an embedding subnetwork that is trained to minimize a triplet loss function may determine distances between pairs of features included in the training vectors. The example trained embedding subnetwork may be trained to determine that a first distance between a first pair of features having a common classification is less than a second distance between the second pair of features having a different classification.

At block 340, the process depicted in FIG. 3 involves generating an output probability of the unstructured input data object and an unstructured reference data object belonging to a common class. In some cases, the output probability is generated by applying the relationship subnetwork to an input feature vector and a reference feature vector that are computed by the embedding subnetwork. For example, the embedding subnetwork 130 may generate the input feature vector 255 based on the unstructured input data object 155, and the reference feature vector 225 based on the unstructured reference data object 125. In addition, the relationship subnetwork 140 may generate the output 247 indicating a probability of the unstructured input data object 155 and the unstructured reference data object 125 belonging to a common class. In some cases, one or both of the embedding subnetwork and the relationship subnetwork receive an objective, such as the feature objective 235 and the relationship objective 245. In some cases, such as in a loosely coupled architecture, the embedding subnetwork and the relationship subnetwork each receive respective objectives. In addition, such as in a tightly coupled architecture, the embedding subnetwork in the relationship subnetwork receive the same objective.

In some aspects regarding block 340, the input feature vector and the reference feature vector are provided from an output layer of the embedding subnetwork to an input layer of the relationship subnetwork. In addition, the output probability is generated by applying a trained relationship subnetwork to the input feature vector and reference feature vector. For example, the trained relationship subnetwork may be trained to determine output probabilities for pairs of features in training feature vectors. The training may include determining whether a particular pair of features in the training feature vectors belong to a common class.

At block 350, the process depicted in FIG. 3 involves transmitting a responsive message based on the output probability. For example, the decision module 190 may generate the decision output 115 based on the output probability. The decision output 115 may be provided to the authentication module 150. In addition, the authentication server system 100 may provide the query response 170 to the client computing system 180. In some cases, one or more of the decision output 115 or the query response 170 may be provided in response to the authentication query 160. In some aspects regarding block 350, the responsive message is configured to cause a receiving computing system to grant or deny access to services controlled by the receiving computing system. For example, the query response 170 may be configured to cause the client computing system 180 to allow or deny access to services requested by the user device 185. The query response 170 may include, for example, a positive response indicating a match between unstructured data provided by the user device 185 and the unstructured reference data object 125; a negative response indicating a dissimilarity between unstructured data provided by the user device 185 and the unstructured reference data object 125; a request for additional authenticating information from the user device 185; or any other suitable response. In addition, the client computing system 180 may be configured to allow or deny access of the user device 185 based on the information included in the query response 170.

In some aspects, one or more of the embedding subnetwork or the relationship subnetwork are trained based on training data. Training data may be received, for example, from one or more of a data repository, such as the security referenced data repository 120, or an additional computing system, such as the client computing system 180. In some cases, the embedding subnetwork and the relationship subnetwork are trained based on respective data sets. For example, the embedding subnetwork 130 may be trained based on unstructured training data objects included in a first set of training data that is accessible by the dual deep learning module 110. In addition, the relationship subnetwork 140 may be trained based on unstructured decision training data included in a second set of training data, such as a second set that is controlled by (or otherwise accessible via) the client computing system 180.

In some aspects, an embedding subnetwork, such as the embedding subnetwork 130, may determine one or more embedded features of unstructured data, such as the unstructured data objects 155 or 125. The embedding subnetwork may be a deep neural network that is suitable for a data type of the unstructured data (e.g., image data, audio data, time series data). The embedding subnetwork may generate an embedding space based on features of the unstructured data. The embedding space may be a multi-dimensional space.

In some cases, the embedding space is generated based on a function, such as a minimization function. For example, the embedding subnetwork may generate the embedding space based on one or more of a triplet loss cost function, a negative log likelihood, a contrastive loss function, or any other suitable minimization function. In some cases, the embedding subnetwork may determine one or more feature vectors that are mapped to the generated embedding space. For example, in an original feature space of the unstructured data set, one or more feature vectors may have a mapping indicated by the example Equation 1.

$$\|x_i - x_i^+\|_2^2 > \|x_i - x_i^-\|_2^2 \qquad \text{Eq. 1}$$

In Equation 1, $x_i$ is the ith data point in a data set, such as an unstructured data set. In addition, $x_i^+$ and $x_i^-$ are each additional data points from the set, where $x_i^+$ has the same class as $x_i$ (positive), and $x_i^-$ has a different class from $x_i$ (negative). In some cases, each point in a positive pair may have a same label (e.g., a label from a same classification), and each point in a negative pair may have a different label (e.g., a label from a different classification). A Euclidean distance between each point $x_i$ and $x_i^+$ in the positive pair of data points may be determined based on an $l_2$ norm of the points $x_i$ and $x_i^+$. An additional Euclidean distance between each point $x_i$ and $x_i^-$ in the negative pair of data points may be determined based on another $l_2$ norm of the points $x_i$ and $x_i^-$. In some cases, the embedding subnetwork may be trained to identify a set of data points in an unstructured data set, such as the positive pair of data points $x_i$ and $x_i^+$, to generate a feature vector based on the set of data points. In some cases, Equation 1 indicates that, in the original space of the unstructured data set, a Euclidean distance between the positive pair of data points $x_i$ and $x_i^+$ is greater than a Euclidean distance between the negative pair of data points $x_i$ and $x_i^-$.

In addition, the embedding subnetwork may be trained to generate an embedding space to which the feature vector may be mapped, in which the mapped positive pairs $x_i$ and $x_i^+$ have a Euclidean distance that is less than a Euclidean distance between the negative pairs $x_i$ and $x_i^-$. In some cases, the embedding subnetwork is trained to generate the embedding space based on a triplet loss cost function. Equation 2 includes an example of a triplet loss cost function.

$$L = \sum_{i=1}^{N} \|f(x_i) - f(x_i^+)\|_2^2 - \|f(x_i) - f(x_i^-)\|_2^2 + \alpha \quad \text{Eq. 2}$$

In Equation 2, the function $f(\cdot)$ represents a mapping function generated by the embedding subnetwork. In addition, the term $\alpha$ indicates a margin parameter. In Equation 2, the result L may be based on a summation of differences between the Euclidean distances (e.g., based on a respective $l_2$ norm) of each triplet of data points $x_i$, $x_i^+$, and $x_i^-$, for all points $x_i$ in an unstructured data set having a quantity of N data points. In addition, the result L may indicate a loss value associated with the mapping function $f(\cdot)$.

The embedding subnetwork may be trained to minimize the loss value L of the Equation 2. For example, the embedding subnetwork may be trained to generate the mapping function $f(\cdot)$ such that the loss value L is minimized. In some cases, the embedding space generated by the embedding subnetwork is based on the mapping function $f(\cdot)$. In addition, the embedding subnetwork may iteratively calculate or modify the mapping function $f(\cdot)$ to generate the embedding space. In some cases, an embedding subnetwork may be trained based on minimization of additional functions, such as a softmax function or a negative log likelihood function. In addition, an embedding subnetwork may include an unsupervised deep neural network, such as a deep belief neural network or a stacked auto-encoder.

In some aspects, operations related to one or more of the optimization or the minimization of the functions may be repeated. For example, the embedding subnetwork may perform iterations of the minimization of Equation 2 (or another loss function) until one or more criteria are satisfied, such as a convergence criteria. Examples of convergence criteria include, without limitation, a threshold level of change in the loss function, e.g., for additional iterations of calculating the loss function; a threshold error rate of the loss function; a threshold change in the error rate of the loss function; or any suitable convergence criterion or combination of criteria.

Figure 4:
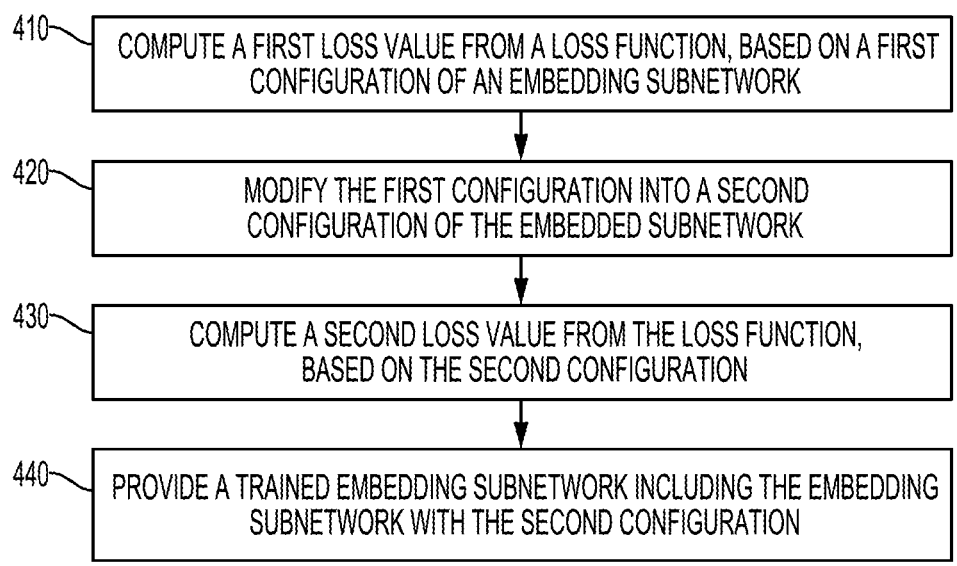
FIG. 4 is a flowchart depicting an example of a process for training an embedding subnetwork, according to some aspects of the present disclosure.

FIG. 4 is a flow chart depicting an example of a process for training an embedding subnetwork. In some aspects, such as described in regards to FIGS. 1-3, a system executing an embedding subnetwork implements operations described in FIG. 4, by executing suitable program code. For illustrative purposes, the process in FIG. 4 is described with reference to the examples depicted in FIGS. 1-3. Other implementations, however, are possible.

At block 410, the process depicted in FIG. 4 involves computing a first loss value from a loss function. In some aspects, the first loss value is computed based on a first configuration of an embedding subnetwork. For example, an embedding subnetwork, such as the embedding subnetwork 130, may compute a loss value L based on the Equation 2. In addition, the first configuration of the embedding subnetwork may be based on a first iteration of the mapping function $f(\cdot)$, in regards to Equation 2.

At block 420, the process depicted in FIG. 4 involves modifying the first configuration into a second configuration. In some cases, the first configuration of the embedding subnetwork may be modified to a second configuration of the embedding subnetwork. For example, the embedding subnetwork may perform a second iteration of the mapping function $f(\cdot)$, and the second configuration of the embedding subnetwork may be based on the second iteration.

At block 430, the process depicted in FIG. 4 involves computing a second loss value from the loss function. In some aspects, the second loss value is computed based on the second configuration of the embedding subnetwork. For example, the embedding subnetwork may compute a second loss value L based on the second iteration of the mapping function $f(\cdot)$.

At block 440, the process depicted in FIG. 4 involves providing a trained embedding subnetwork based on the second configuration. For example, the trained embedding subnetwork may include the embedding subnetwork having the second configuration. In some cases, the trained embedding subnetwork is provided as an output, such as an output of a training sequence for the embedding subnetwork 130.

In some aspects, one or more of the dual deep learning neural network 200, the embedding subnetwork 130, or the relationship subnetwork 140 may be modified, such as during training. Modification of a neural network may include one or more of modifying an architecture of the neural network or modifying a process performed by the neural network. Architectural modifications may include, without limitation, adding or removing layers, adding or removing nodes, adding or removing connections between layers or notes, or any other suitable architectural modification. Process modifications may include, without limitation, changing an equation used by the neural network, changing a weight of a term in an equation, adding or removing an equation used by the neural network, or any other suitable processing modification.

A trained neural network may be applied to multiple target data sets. For example, a trained neural network may be applied to multiple unstructured image data sets, such as images received from various user devices associated with multiple authentication requests. A conventional trained neural network may provide an inaccurate interpretation of the unstructured data sets. For example, a conventional trained neural network may provide decision data based on training data that is dissimilar to the target data sets. In some cases, a conventional trained neural network may be partially retrained, such as by using transfer learning techniques. Transfer learning techniques may include retraining a relatively small number of top layers in the conventional trained neural network based on a target data set and a target objective. However, retraining the conventional neural network for every additional target data set may result in an inefficient use of computing resources (e.g., resources used during retraining). In addition, the retrained conventional neural network may provide output with sub-optimal accuracy, as the conventional neural network is only partially retrained based on the additional target data set.

In some cases, a dual deep learning neural network may provide a systematic technique for optimizing decision outputs based on multiple unstructured target data sets. For example, a first deep learning network, such as the embedding subnetwork, may determine one or more feature vectors based on the unstructured target data set. In addition, a second deep learning network, such as the relationship subnetwork, determines a similarity relationship among the feature vectors from unstructured target data set. One or both of the first or second deep learning networks may optimize their output based on an objective, such as a learning objective corresponding to an indicated task.

In some aspects, a relationship subnetwork, such as the relationship subnetwork 140, may determine a similarity between unstructured data objects, such as between the unstructured data objects 155 and 125 based on feature vectors for the unstructured data objects, such as the input feature vector 255 and the reference feature vector 225. In addition, the relationship subnetwork may map features from the feature vectors to an embedding space. The embedding space may be generated to have a higher dimensionality than a feature vector on which the generated embedding space is based. For example, the relationship subnetwork 140 may map features from the input feature vector 255 and the reference feature vector 225 to an embedding space having a higher dimensionality than either of the feature vectors 225 and 255. In some cases, the relationship subnetwork may be a deep neural network.

The relationship subnetwork may determine a similarity value for each pair of data points in the feature vectors. In addition, the similarity value may be optimized based on an indicated learning objective. For example, the relationship subnetwork 140 may optimize the output 247 based on the relationship objective 245. The optimization of the output 247 may be based on a minimization of a loss function, such as a binary cross entropy function, a contrastive loss function, or any other suitable loss function. In some cases, multiple subnetworks of the dual deep learning neural network may be modified based on a learning objective. For example, the embedding subnetwork 130, the relationship subnetwork 140, or a combined neural network including both the embedding and relationship subnetworks may be modified based on the relationship objective 245. In addition, outputs of the embedding subnetwork 130 or relationship subnetwork 140, or a combined output of both, may be optimized based on the relationship objective 245, such as by a gradient descent optimization of the relationship objective 245.

In some aspects, operations related to one or more of the optimization or the minimization of the loss functions may be repeated. For example, the relationship subnetwork may perform iterations of the minimization of the loss function until one or more criteria are satisfied, such as a convergence criteria. Examples of convergence criteria include, without limitation, a threshold level of change in the loss function, e.g., for additional iterations of calculating the loss function; a threshold error rate of the loss function; a threshold change in the error rate of the loss function; or any suitable convergence criterion or combination of criteria. In some cases, the relationship subnetwork may be a deep neural network that is suitable for the indicated objective (e.g., classification, identification).

In some cases, the indicated objective is a classification task. For a classification task, the relationship subnetwork may include a deep belief neural network that is configured to provide a probability of multiple unstructured data sets having a common classification. For example, a probability of two unstructured data sets I and J having a common classification may be given by the example Equation 3.

$$D(x^{(i)},x^{(j)})=P(y^{(i)}=y^{(j)})$$ Eq. 3

In Equation 3, $D(\cdot)$ is a function having the inputs of a first feature vector $x^{(i)}$ associated with an unstructured data set I and a second feature vector $x^{(j)}$ associated with an unstructured data set J. A value of the function $D(\cdot)$ is given as the probability P that a first classification $y^{(i)}$ of the unstructured data set I and a second classification $y^{(j)}$ of the unstructured data set J are identical. In some cases, the relationship subnetwork may have a structure represented by the function $D(\cdot)$.

In addition, the relationship subnetwork may be trained to determine the probability P based on a minimization of a cost function. An example of a cost function that is suitable for a classification task is provided by the example Equation 4.

$$L=\Sigma_{i,j}(y^{(i,j)}\log D(x^{(i)},x^{(j)})+(1-y^{(i,j)})\log(1-D(x^{(i)},x^{(j)})))$$ Eq. 4

In Equation 4, the term $y^{(i,j)}$ is assigned a value of 1 if $y^{(i)}=y^{(j)}$ and assigned a value of 0 otherwise. In Equation 4, the result L may be based on a summation of the sums of the term $y^{(i,j)}$ and logarithmic functions based on the function $D(\cdot)$. In addition, the result L may indicate a loss value associated with the function $D(\cdot)$.

In some cases, the indicated objective is an identification task. The relationship subnetwork may be trained to determine a similarity S between two unstructured data sets I and J. In addition, the relationship subnetwork may be trained to determine the similarity S based on a minimization of a cost function. An example of a cost function that is suitable for an identification task is provided by the example Equation 5.

$$L=\Sigma_i S(x_i,x_i^-)-\Sigma_i S(x_i,x_i^+)$$ Eq. 5

In Equation 5, $x_i$ is the ith data point in a data set, such as either of the unstructured data sets I and J. In addition, $x_i^+$ and $x_i^-$ are each additional data points from the set, where $x_i^+$ has the same class as $x_i$ (positive), and $x_i^-$ has a different class from $x_i$ (negative). In Equation 5, the result L may be based on a difference between a summation of similarities (for all values of i) for the negative pairs of data points $x_i$ an d $x_i^-$ and a summation of similarities (for all values of i) for the positive pair of data points $x_i$ an d $x_i$+. In addition, the result L may indicate a loss value associated with the similarity function $S(\cdot)$. In some cases, Equation may minimize similarities of negative pairs of data points and maximize similarities of positive pairs of data points.

For an identification task, the relationship subnetwork may include a rectified linear activation function, such that each layer j in the rectified linear activation function has an output of $H_j$, a weight matrix $W_j$ and a bias vector $b_j$. In an example rectified linear activation function, an output of each layer j may be given by the example Equation 6.

$$H_{j+1}=\max(0,W_j \cdot H_j+b_j)$$ Eq. 6

In Equation 6, the output of the layer j+1 is based on a maximum of a product of the output $H_j$ and weight matrix $W_j$ added to the bias vector $b_j$ of the previous layer previous j, or the value of 0. In some cases, the output of the relationship subnetwork may have a structure represented by the function $D(\cdot)$, as given in the example Equation 7.

$$D(\cdot)=\text{sigmoid}(W_{out} \cdot H_{out}+b_{out})$$ Eq. 7

In Equation 7, $D(\cdot)$ is a sigmoid function based on the output of the final layer of the rectified linear activation function, such as described in regards to Equation 6. For each point $x_i$ in an input feature vector, $D(\cdot)$ is optimized as $D(x_i, x_i^-)$ approaches 0 and $D(x_i, x_i^+)$ approaches 1.

In some aspects, the structure of the relationship subnetwork is preserved, such that it is configured to receive inputs from the embedding subnetwork. For example, the relationship subnetwork may receive, from the embedding subnetwork, inputs including a first feature vector $x^{(i)}$ associated with an unstructured data set I and a second feature vector $x^{(j)}$ associated with an unstructured data set J. in some cases, a mapping of data points from the feature vectors $x^{(i)}$ and $x^{(j)}$ may be provided by $H_0(\cdot)$, such as given in the example Equation 8.

$$H_0(x^{(i)},x^{(j)})=\{x_1^{(i)}*x_1^{(j)}, \ldots x_M^{(i)}*x_M^{(j)},\exp(-|x_1^{(i)}-x_1^{(j)}|), \ldots \exp(-|x_M^{(i)}-x_M^{(j)}|)\} \quad \text{Eq. 8}$$

In some cases, the output DO of the relationship subnetwork is based on a mapping provided by Equation 8. In addition, the components of may be calculated based on various layers, or portions of layers, of the relationship subnetwork. For example, a multiplication of $x_1^{(i)}$ and $x_1^{(j)}$ may be performed by a first portion of a layer, and applying an exponential operation to a difference between $x_1^{(i)}$ and $x_1^{(j)}$ may be performed by a second portion of a layer.

In some aspects, the relationship subnetwork is trained in two stages, such as an initializing stage and a tuning stage. In the initializing stage, the relationship subnetwork is trained from random samples of data pairs from the feature vectors associated with unstructured data sets. In some cases, such as in tasks including facial recognition or voice recognition, the positive pairs may be dominated by the negative pairs. In such examples, the negative pairs may be undersampled to provide a comparable proportion of positive pairs and negative pairs. All the positive pairs in the training data are included along a random sample of the negative pairs to form the training pair data.

In the tuning stage, a more sophisticated strategy to form the training pair data is used. First, given a data instance $x_i$ (from the original data), all same-class pairs $(x_i, x_i^+)$ are formed for that instance. The maximum intra-similarity for $x_i$ is used as a threshold to obtain the negative pairs. In other words, only $(x_i, x_i^-)$ with $D(x_i, x_i^-) > D(x_i, x_i^+)$ is included in the training pair data. If the proportion of the positive pairs is still dominated by the negative ones, an undersampling strategy, such as described in regards to the initializing stage, may be applied in every iteration.

Figure 5:
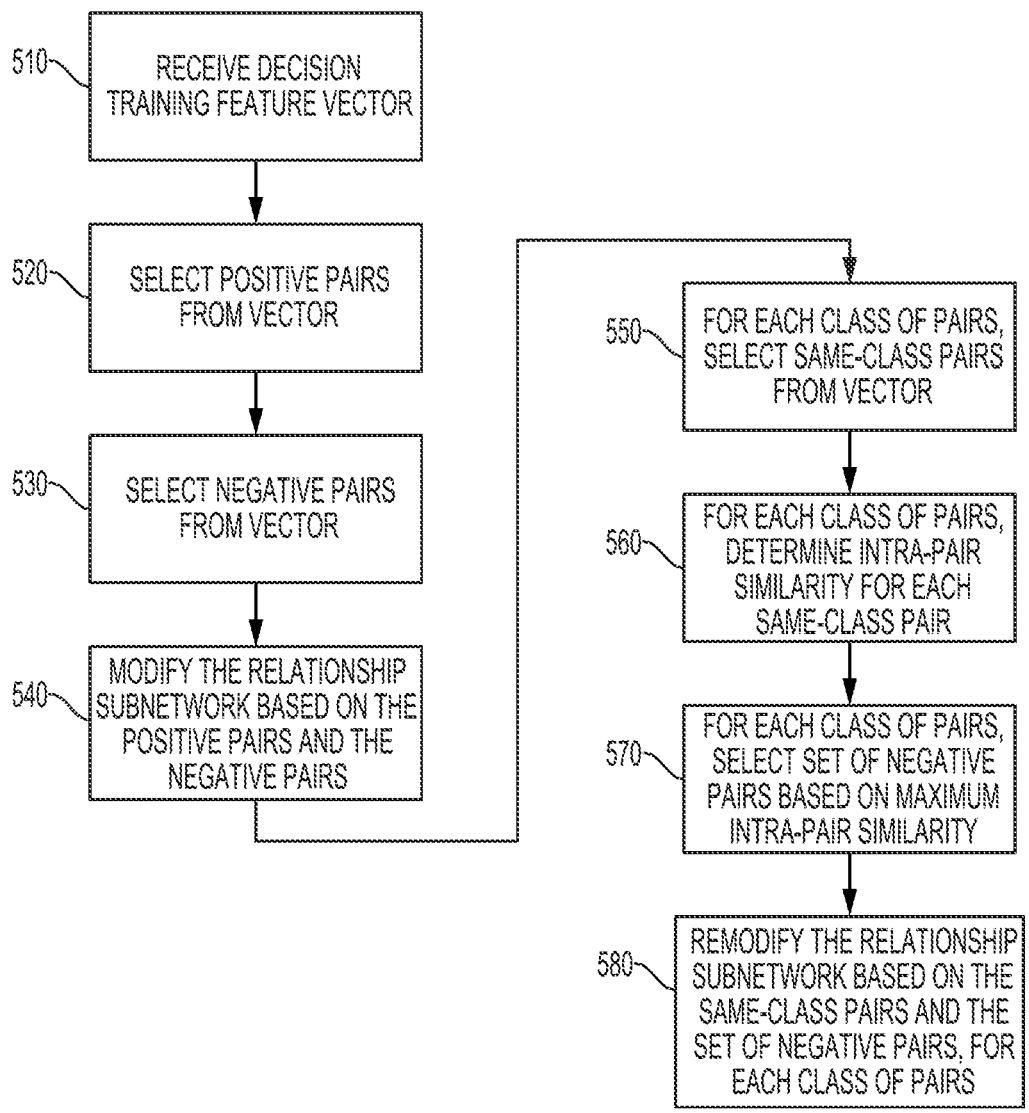
FIG. 5 is a flow chart depicting an example of a process for training a relationship subnetwork based on selected positive and negative pairs, according to some aspects of the present disclosure.

FIG. 5 is a flow chart depicting an example of a process for training a relationship subnetwork based on selected positive point pairs and negative point pairs. In some aspects, such as described in regards to FIGS. 1-4, a system executing a relationship subnetwork implements operations described in FIG. 5, by executing suitable program code. For illustrative purposes, the process in FIG. 5 is described with reference to the examples depicted in FIGS. 1-4. Other implementations, however, are possible.

At block 510, a relationship subnetwork executing the process depicted in FIG. 5 may begin an initialization stage. At block 510, the process depicted in FIG. 5 involves receiving one or more training feature vectors. In some cases, each training feature vector is associated with an unstructured training data object. In addition, the training feature vector may be received by a relationship subnetwork, such as the relationship subnetwork 140.

At block 520, the process depicted in FIG. 5 involves selecting one or more positive pairs of data points from the training feature vector. In some cases, the selection includes all positive pairs of data points from the training feature vector. At block 530, the process depicted in FIG. 5 involves selecting one or more negative pairs of data points from the training feature vector. In some cases, a quantity of the selected negative pairs is equivalent, or approximately equivalent, to a quantity of the selected positive pairs. For example, a proportion of the selected negative pairs and selected positive pairs may be similar.

At block 540, the process depicted in FIG. 5 involves modifying the relationship subnetwork based on the selected positive pairs and selected negative pairs. For example, the relationship subnetwork 140 may be trained based on the selected positive and negative pairs.

At block 550, a relationship subnetwork executing the process depicted in FIG. 5 may begin a tuning stage. At block 550, the process depicted in FIG. 5 involves selecting, from the training feature vector, one or more positive pairs of data points having a common classification. In some cases, the selection includes all same-class positive pairs of data points from the training feature vector.

At block 560, the process depicted in FIG. 5 involves determining an intra-pair similarity for each pair of points in the same-class positive pairs. For example, the intra-pair similarity may be determined between a particular point $x_i$ and a particular point $x_i^+$ in a given same-class pair of data points. In addition, a maximum intra-pair similarity may be determined based on the intra-pair similarities of all of the selected same-class pairs.

At block 570, the process depicted in FIG. 5 involves selecting, from the training feature vector, a set of negative pairs of data points based on the maximum intra-pair similarity. In some aspects, each negative pair included in the set of negative pairs has an intra-pair similarity that is greater than the maximum intra-pair similarity of the same-class positive pairs.

At block 580, the process depicted in FIG. 5 involves re-modifying the relationship subnetwork based on the same-class positive pairs and the set of negative pairs. For example, the relationship subnetwork 140 may be retrained based on the same-class positive pairs and the set of negative pairs.

In some aspects, one or more operations described in regards to FIG. 5 may be repeated. For example, the relationship subnetwork may perform multiple iterations of the initialization stage or the tuning stage, or multiple iterations of both stages. In some cases, performing iterations of the one or more stages may improve a probability or similarity described by an output of the relationship subnetwork.

In some aspects, a relationship subnetwork may be trained based on one or more training feature vectors that are generated by an embedding subnetwork. For example, an embedding subnetwork 130 may be applied to one or more unstructured training data objects to generate one or more training feature vectors. In addition, the relationship subnetwork may be trained based on sets of the training feature vectors, where the feature vectors included in a set have at least one pair of features with a common classification.

Figure 6:
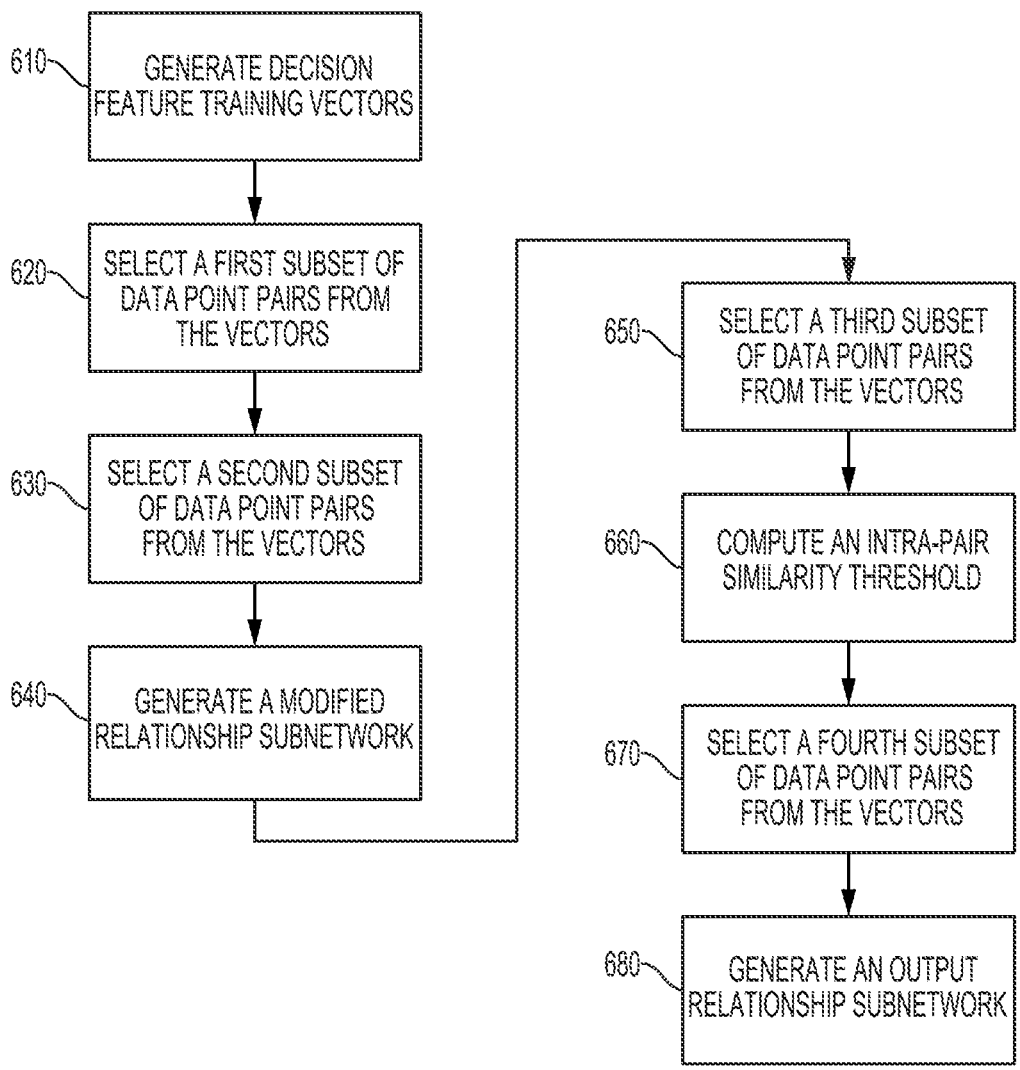
FIG. 6 is a flow chart depicting an example of a process for training a relationship subnetwork based on sets of training feature vectors, according to some aspects of the present disclosure.

FIG. 6 is a flow chart depicting an example of a process for training a relationship subnetwork based on sets of training feature vectors. In some aspects, such as described in FIGS. 1-5, a system executing a relationship subnetwork implements operations described in FIG. 6, by executing suitable program code. For illustrative purposes, the process and FIG. 6 is described with reference to the examples depicted in FIGS. 1-5. Other implementations, however, are possible.

At block 610, an initial relationship subnetwork executing the process depicted in FIG. 6 may begin an initialization operation. At block 610, the process depicted in FIG. 6 involves generating a set of relationship training feature vectors, such as a set of two relationship training feature vectors. In some cases, the set of relationship training feature vectors is generated based on multiple unstructured training data objects. For example, the set of relationship training feature vectors is generated by applying an embedding subnetwork, such as the embedding subnetwork 130, to multiple unstructured training data objects.

At block 620, the process depicted in FIG. 6 involves selecting the first subset of data point pairs from the set of relationship training feature vectors. In some cases, the first subset of data point pairs may include one data point from each vector included in the set. In addition, the first subset of data point pairs may include data points that have a common class. For example, the first subset of data point pairs may include training data points that are indicated as belonging to a same classification.

At block 630, the process depicted in FIG. 6 involves selecting a second subset of data point pairs from the set of relationship training feature vectors. The second subset of data point pairs may include one data point from each vector included in the set. In some cases, a quantity of pairs in the second subset may be equivalent, or approximately equivalent, to a quantity of pairs in the first subset. In addition, the second subset of data point pairs may include data points that have a different class. For example, the second subset of data point pairs may include training data points that are indicated as belonging to different classifications. In some aspects, the data point pairs selected for the second subset are randomly selected from the relationship training feature vectors.

At block 640, the process depicted in FIG. 6 involves generating a modified relationship subnetwork based on the first subset of data point pairs and the second subset of data point pairs. For example, the initial relationship subnetwork may be modified into a modified relationship subnetwork by training on the first and second subsets of data point pairs.

At block 650, a modified relationship subnetwork executing the process depicted in FIG. 6 may begin a tuning operation. In some cases, the tuning operation is performed subsequent to the initialization operation. At block 650, the process depicted in FIG. 6 involves selecting a third subset of data point pairs from the set of relationship training feature vectors. In some cases, the third subset of data point pairs may include one data point from each vector included in the set. In addition, the third subset of data point pairs may include data points that have the common class. For example, the third subset of data point pairs may include training data points that are indicated as belonging to the same classification as the data point pairs in the first subset.

At block 660, the process depicted in FIG. 6 involves determining an intra-pair similarity threshold based on intra-pair similarities of data point pairs in the third subset. In some cases, the intra-pair similarity threshold is based on a comparison of an intra-pair similarity for a particular data point pair in the third subset and additional intra-pair similarities for additional particular data point pairs in the third subset. For example, the threshold may be determined based on a maximum intra-pair similarity of the similarities of all data point pairs in the third subset.

At block 670, the process depicted in FIG. 6 involves selecting a fourth subset of data point pairs from the set of relationship training feature vectors. In some aspects, the fourth subset of data point pairs are selected based on a comparison with the intra-pair similarity threshold. For example, each data point pair included in the fourth subset may have an intra-pair similarity that is greater than the intra-pair similarity threshold. In some cases, the fourth subset of data point pairs may include one data point from each vector included in the set. In addition, the fourth subset of data point pairs may include data points that do not have the common class, such as data point pairs that are indicated as belonging to a different classification as the data point pairs in the first subset.

At block 680, the process depicted in FIG. 6 involves generating an output relationship subnetwork based on the third subset of data point pairs and the fourth subset of data point pairs. For example, the modified relationship subnetwork may be modified into an output relationship subnetwork by training on the third and fourth subsets of data point pairs. In some cases, the output relationship subnetwork may be generated based on the result of one or more functions implemented with data point from the third or fourth subsets of data point pairs. For example, the relationship subnetwork may determine, based on one or more of the Equations 3-8, a first probability of a first pair of data points from the third class having the common class, and a second probability of a second pair of data points from the fourth subset having the common class. As training data, the third subset was selected to include point pairs having the common class, and the fourth subset was selected to include point pairs not having the common class. In some aspects, the output relationship subnetwork may be generated based on one or more functions that maximize the determined first probability for the first pair of data points from the third class, and minimizes the determined second probability for the second pair of data points from the fourth class.

In some aspects, one or more operations described in regards to FIG. 6 may be repeated. For example, the relationship subnetwork may perform multiple iterations of the initialization stage or the tuning stage, or multiple iterations of both stages. In some cases, performing iterations of the one or more stages may improve a probability or similarity described by an output of the relationship subnetwork. For example, additional iterations of operations related to one or more of blocks 650, 660, 670, or 680 may increase the first probability and decrease the second probability, as described in regards to block 680. In this example, performing the additional iterations may increase the first probability that the point pairs in the third class are calculated to have the common classification, and decrease the second probability that the point pairs in the fourth class are calculated to have the common classification.

Computing System Example for Implementing Certain Aspects

Figure 7:
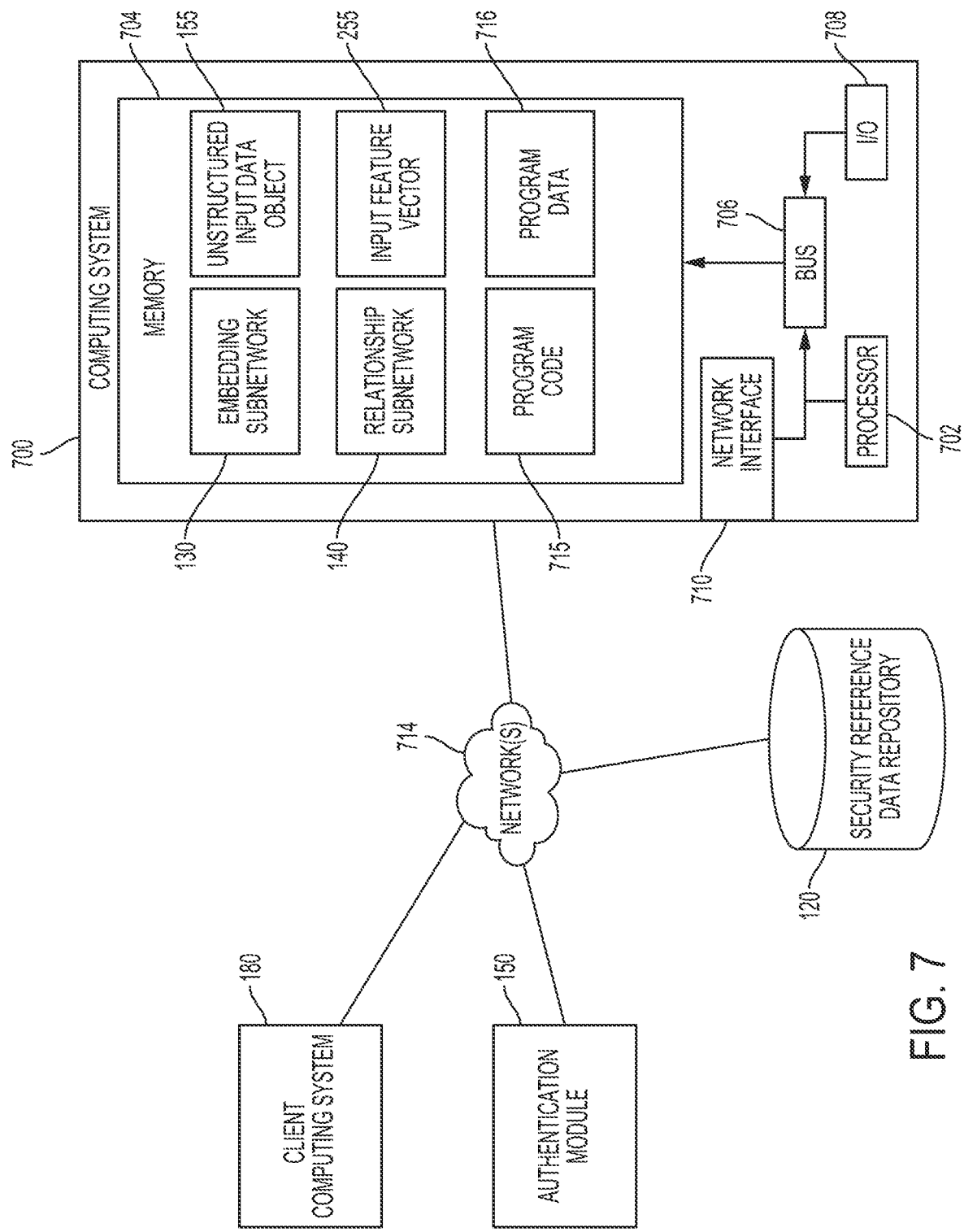
FIG. 7 depicts an example of a computing system for performing one or more operations described herein, according to some aspects of the present disclosure.

Any suitable computing system or group of computing systems can be used for performing the operations described herein. For example, FIG. 7 depicts an example of a computing system 700 that is configured to execute a dual deep learning neural network, such as the dual deep learning neural network 200. In some aspects, a computing system 700 can include multiple computing devices similar to those depicted in FIG. 7 (e.g., a processor, a memory, etc.), and the multiple computing devices could be used to separately implement one or more operations described herein.

The depicted example of the computing system 700 includes a processor 702 communicatively coupled to one or more memory devices 704. The processor 702 executes computer-executable program code stored in a memory device 704, accesses information stored in the memory device 704, or both. Examples of the processor 702 include a microprocessor, an application-specific integrated circuit ("ASIC"), a field-programmable gate array ("FPGA"), or any other suitable processing device. The processor 702 can include any number of processing devices, including a single processing device.

The memory device 704 includes any suitable non-transitory computer-readable medium for storing program code 715, program data 716, or both. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript.

The computing system 700 may also include a number of external or internal devices, such as input or output devices. For example, the computing system 700 is shown with one or more input/output ("I/O") interfaces 708. An I/O interface 708 can receive input from input devices or provide output to output devices. One or more buses 706 are also included in the computing system 700. The bus 706 communicatively couples one or more components of a respective one of the computing system 700.

The computing system 700 executes program code 715 that configures the processor 702 to perform one or more of the operations described herein. Examples of the program code 715 include, in various embodiments, the embedding subnetwork 130, the relationship subnetwork 140, or other suitable applications that perform one or more operations described herein. The program code 715 may be resident in the memory device 704 or any suitable computer-readable medium and may be executed by the processor 702 or any other suitable processor.

The computing system 700 can access program data 716 (e.g., the unstructured input data object 155, the input feature vector 255, etc.) in any suitable manner. In some embodiments, one or more of these data sets, models, and functions are stored in the same memory device (e.g., one of the memory devices 704). In additional or alternative embodiments, one or more of the programs, data sets, models, and functions described herein are stored in different memory devices 704 accessible via a data network.

The computing system 700 also includes a network interface device 710. The network interface device 710 includes any device or group of devices (e.g., a communications network port 134) suitable for establishing a wired or wireless data connection to one or more data networks 714, via which communications with a client device 110 can occur. Non-limiting examples of the network interface device 710 include an Ethernet network adapter, a modem, etc. The computing system 700 is able to communicate with one or more other computing devices (e.g., a client device 110 executing a client application) via a data network 714 using the network interface device 710. Examples of the data network 714 include, but are not limited to, the internet, a local area network, a wireless area network, a wired area network, a wide area network, and the like.

In some aspects one or more additional computing devices are connected to the computing system 700 via the networks 714, and the additional computing devices can perform some of the operations described herein. For example, the security reference data repository 120 may be connected to the computing system 700 via network 190, and the database 180 can receive or provide some of the program data described herein, such as the unstructured reference data object 125. In addition, the computing system 700 may be configured to communicate with one or more of the authentication module 150 or the client computing system 180, such as to provide the query response 170 or the output 247.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, throughout this specification terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computing systems accessing stored software that programs or configures the computing system from a general-purpose computing apparatus to a specialized computing apparatus implementing one or more aspects of the present subject matter. Any suitable programming, scripting, or other type of language or combinations of languages may be used to implement the teachings contained herein in software to be used in programming or configuring a computing device.

Aspects of the methods disclosed herein may be performed in the operation of such computing devices. The order of the blocks presented in the examples above can be varied—for example, blocks can be re-ordered, combined, or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific aspects thereof, it will be appreciated that those skilled in the art, upon attaining an understanding of the foregoing, may readily produce alterations to, variations of, and equivalents to such aspects. Any aspects or examples may be combined with any other aspects or examples. Accordingly, it should be understood that the present disclosure has been presented for purposes of example rather than limitation, and does not preclude inclusion of such modifications, variations, or additions to the present subject matter as would be readily apparent to one of ordinary skill in the art.

What is claimed is:

1. A method in which one or more processing devices of an authentication server system perform operations comprising:
servicing an authentication query by matching an unstructured input data object included as a query parameter in the authentication query to an unstructured reference data object stored in a memory device of the authentication server system, wherein matching the unstructured input data object to the unstructured reference data object comprises:
providing the unstructured input data object to a dual deep learning network, wherein the dual deep learning network is configured to determine a similarity between unstructured data objects based on embedded features in the unstructured input data object and features of the unstructured reference data object,
applying a relationship subnetwork of the dual deep learning network to an input feature vector and a reference feature vector, wherein the input feature vector and the reference feature vector are generated by an embedding subnetwork of the dual deep learning network, and
obtaining, from the dual deep learning network, an output probability of the unstructured input data object and the unstructured reference data object belonging to a common class; and
transmitting, to a client computing system, a responsive message to the authentication query that is generated from the output probability, wherein the responsive message is configured for causing the client computing system to grant or deny access to the client computing system by a user device from which the unstructured input data object was obtained.

2. The method of claim 1, wherein the embedding subnetwork comprises one or more of:
a convolutional neural network that receives the unstructured input data object comprising an image data object depicting a user of the user device,
a three-dimensional convolutional neural network that receives the unstructured input data object comprising a three-dimensional data object depicting the user of the user device, and
a recurrent neural network that receives the unstructured input data object comprising a dataset describing a sequence of interactions involving the user of the user device.

3. The method of claim 2, wherein the embedding subnetwork is trained to generate training feature vectors from unstructured training data objects based on a minimization of a loss function for a feature learning objective, wherein the embedding subnetwork is trained via training operations comprising:
computing, based on a first configuration of the embedding subnetwork, a first loss value from the loss function that includes a summation of (i) a difference between respective $l_2$ norms of first and second pairs of the training feature vectors and (ii) a margin term;
modifying the first configuration into a second configuration of the embedding subnetwork;
computing, based on a second configuration of the embedding subnetwork, a second loss value from the loss function; and
outputting the embedding subnetwork with the second configuration as the trained embedding subnetwork.

4. The method of claim 3, wherein the relationship subnetwork is trained via training operations comprising:
generating the training feature vectors by applying the embedding subnetwork, as trained, to unstructured decision training data; and
performing an initialization operation comprising:
accessing an initial relationship subnetwork,
forming data point pairs based on the training feature vectors,
computing, for each of the data point pairs, a pairwise similarity between a first point in the data point pair and a second point in the data point pair,
computing the loss function based on the pairwise similarities, and
generating a modified decision subnetwork based on the computed loss function.

5. The method of claim 4, wherein the data point pairs are randomly selected such that a number of data point pairs having the common class is equal to a number of the data point pairs having a different class, and
wherein the training operations further comprise:
generating a modified relationship subnetwork by training the initial relationship subnetwork with the data point pairs; and
performing, subsequent to the initialization operation, a tuning operation comprising:
selecting, from the training feature vectors, a first subset of data point pairs having the common class,
computing, with the initial relationship subnetwork, an intra-pair similarity threshold based on similarities between a particular data point pair from the first subset of data point pairs,
selecting, from the training feature vectors, a second subset of data point pairs, where no two data points in any pair have the common class, wherein the second subset of data point pairs is selected based on determining, with the modified relationship subnetwork, that a respective similarity of each data point pair from the second subset of data point pairs is higher the intra-pair similarity threshold, and
generating an output relationship subnetwork by training the modified relationship subnetwork with the first subset of data point pairs and the second subset of data point pairs.

6. The method of claim 5, wherein training one or more of the initial relationship subnetwork and the modified relationship subnetwork comprises iterations of computing, with the one or more of the initial relationship subnetwork and the modified relationship subnetwork, a first probability of a particular pair of the data point pairs belonging to a common training class and a second probability of the particular pair belonging to different training classes, wherein performing the iterations increases the probability computed for the particular pair belonging to the common training class and decreases the probability computed for the particular pair belonging to the different training classes.

7. The method of claim 6, wherein the embedding subnetwork is trained via further training operations comprising iteratively generating a modified embedding subnetwork based on the probability of a first pair and the probability of a second pair, wherein performing the iterations decreases the probability computed for the first pair and increases the probability computed for the second pair.

8. The method of claim 4, wherein the unstructured training data objects used to train the embedding subnetwork are included in a first training dataset and the unstructured decision training data is included in a second dataset controlled by the client computing system.

9. The method of claim 1, wherein the reference feature vector is computed by applying the embedding subnetwork to the unstructured reference data object, and wherein the relationship subnetwork maps the input feature vector and the reference feature vector into a multi-dimensional space having a higher dimensionality than each of the input feature vector and the reference feature vector.

10. The method of claim 9, wherein the relationship subnetwork comprises an input layer and wherein a layer of the relationship subnetwork having the higher dimensionality transforms the input feature vector and the reference feature vector, wherein transforming the input feature vector and the reference feature vector comprises:
    multiplying, at a first portion of the input layer of the relationship subnetwork, an element from the input feature vector and a corresponding element from the reference feature vector; and
    applying, at a second portion of the input layer of the relationship subnetwork, an exponential operation to a difference between the element from the input feature vector and the corresponding element from the reference feature vector.

11. A system comprising:
a processing device; and
a memory device communicatively coupled to the processing device,
wherein the processing device is configured for executing instruction stored in the memory device and thereby performing operations comprising:
    matching an unstructured input data object to an unstructured reference data object, wherein matching the unstructured input data object to the unstructured reference data object comprises:
        providing the unstructured input data object to a dual deep learning network, wherein the dual deep learning network is configured to determine a similarity between unstructured data objects based on embedded features in the unstructured input data object and features of the unstructured reference data object,
        applying a relationship subnetwork of the dual deep learning network to an input feature vector and a reference feature vector, wherein the input feature vector and the reference feature vector are generated by an embedding subnetwork of the dual deep learning network, and
        obtaining, from the dual deep learning network, an output probability of the unstructured input data object and the unstructured reference data object belonging to a common class; and
    outputting a result based on the output probability.

12. The system of claim 11, wherein the relationship subnetwork is trained via training operations comprising:
    generating the training feature vectors by applying the embedding subnetwork, as trained, to unstructured decision training data; and
    performing an initialization operation comprising:
        accessing an initial relationship subnetwork,
        forming data point pairs based on the training feature vectors,
        computing, for each of the data point pairs, a pairwise similarity between a first point in the data point pair and a second point in the data point pair,
        computing a loss function based on the pairwise similarities, and
        generating a modified decision subnetwork based on the computed loss function.

13. The system of claim 12, wherein the data point pairs are randomly selected such that a number of data point pairs having the common class is equal to a number of the data point pairs having a different class, and
wherein the training operations further comprise:
    generating a modified relationship subnetwork by training the initial relationship subnetwork with the data point pairs; and
    performing, subsequent to the initialization operation, a tuning operation comprising:
        selecting, from the training feature vectors, a first subset of data point pairs having the common class,
        computing, with the initial relationship subnetwork, an intra-pair similarity threshold based on similarities between a particular data point pair from the first subset of data point pairs,
        selecting, from the training feature vectors, a second subset of data point pairs, where no two data points in any pair have the common class, wherein the second subset of data point pairs is selected based on determining, with the modified relationship subnetwork, that a respective similarity of each data point pair from the second subset of data point pairs is higher the intra-pair similarity threshold, and
        generating an output relationship subnetwork by training the modified relationship subnetwork with the first subset of data point pairs and the second subset of data point pairs.

14. The system of claim 13, wherein training one or more of the initial relationship subnetwork and the modified relationship subnetwork comprises iterations of computing, with the one or more of the initial relationship subnetwork and the modified relationship subnetwork, a first probability of a particular pair of the data point pairs belonging to a common training class and a second probability of a particular pair of the data point pairs belonging to different training classes, wherein performing the iterations increases the probability computed for the particular pair belonging to the common training class and decreases the probability computed for the particular pair belonging to the different training classes.

15. The system of claim 14, wherein the embedding subnetwork is trained by iteratively generating a modified embedding subnetwork based on the probability of a first pair and the probability of a second pair, wherein performing the iterations decreases the probability computed for the first pair and increases the probability computed for the second pair.

16. The system of claim 12, wherein the unstructured training data objects used to train the embedding subnetwork are included in a first training dataset and the unstructured decision training data is included in a second dataset controlled by a client computing system.

17. The system of claim 11, wherein the reference feature vector is computed by applying the embedding subnetwork to the unstructured reference data object, and wherein the relationship subnetwork maps the input feature vector and the reference feature vector into a multi-dimensional space having a higher dimensionality than each of the input feature vector and the reference feature vector.

18. The system of claim 17, wherein the relationship subnetwork comprises an input layer and wherein a layer of the relationship subnetwork having the higher dimensionality transforms the input feature vector and the reference feature vector, wherein transforming the input feature vector and the reference feature vector comprises:
   multiplying, at a first portion of the input layer of the relationship subnetwork, an element from the input feature vector and a corresponding element from the reference feature vector; and
   applying, at a second portion of the input layer of the relationship subnetwork, an exponential operation to a difference between the element from the input feature vector and the corresponding element from the reference feature vector.

19. A non-transitory computer-readable storage medium having program code that is executable by a processor device to cause a computing device to perform operations comprising:
   matching an unstructured input data object to an unstructured reference data object,
      wherein matching the unstructured input data object to the unstructured reference data object comprises:
         providing the unstructured input data object to a dual deep learning network, wherein the dual deep learning network is configured to determine a similarity between unstructured data objects based on embedded features in the unstructured input data object and features of the unstructured reference data object,
         applying a relationship subnetwork of the dual deep learning network to an input feature vector and a reference feature vector, wherein the input feature vector and the reference feature vector are generated by an embedding subnetwork of the dual deep learning network, and
         obtaining, from the dual deep learning network, an output probability of the unstructured input data object and the unstructured reference data object belonging to a common class; and
   outputting a result based on the output probability.

20. The non-transitory computer-readable storage medium of claim 19, wherein the relationship subnetwork is trained via training operations comprising:
   generating the training feature vectors by applying the embedding subnetwork, as trained, to unstructured decision training data; and
   performing an initialization operation comprising:
      accessing an initial relationship subnetwork,
      forming data point pairs based on the training feature vectors,
      computing, for each of the data point pairs, a pairwise similarity between a first point in the data point pair and a second point in the data point pair,
      computing a loss function based on the pairwise similarities, and
      generating a modified decision subnetwork based on the computed loss function.

* * * * *